United States Patent [19]

Calvert et al.

[11] Patent Number: 4,504,089
[45] Date of Patent: Mar. 12, 1985

[54] LIQUID-CUSHIONED BICYCLE SEAT

[76] Inventors: Nathaniel Calvert, 3102 Crescent La. NW.; George L. Battey, 807 13th Ave. NE., both of Rochester, Minn. 55901

[21] Appl. No.: 342,131

[22] Filed: Jan. 25, 1982

[51] Int. Cl.³ .............................................. B62J 1/18
[52] U.S. Cl. .................................... 297/214; 297/200
[58] Field of Search ............... 297/199, 200, 214, 218, 297/224

[56] References Cited

U.S. PATENT DOCUMENTS

| | | | |
|---|---|---|---|
| 484,367 | 10/1892 | Hicks | 297/199 X |
| 556,448 | 3/1896 | Van Meter | 297/200 |
| 560,963 | 5/1896 | Bartlett | 297/200 |
| 1,322,959 | 11/1919 | Sawasaki | 297/214 |
| 2,173,224 | 9/1939 | Bergwall | 297/199 |
| 2,558,389 | 6/1951 | Robinson | 297/200 |

FOREIGN PATENT DOCUMENTS

| | | | |
|---|---|---|---|
| 523528 | 4/1955 | Italy | 297/200 |
| 7496 | of 1897 | United Kingdom | 297/200 |

Primary Examiner—William E. Lyddane
Assistant Examiner—Peter A. Aschenbrenner
Attorney, Agent, or Firm—William J. Ryan

[57] ABSTRACT

A liquid-cushioned bicycle seat comprising a liquid impervious bladder divided into a saddle compartment and a pummel compartment which are hydrostatically isolated from one another so that differing hydrostatic pressures may be maintained in each respective compartment, the saddle compartment having first and second zones in fluid communication with each other; separate means for filling the saddle compartment and the pummel compartment with a cushioning liquid; and means for securing said bladder in support of engagement with the seat of a bicycle.

2 Claims, 5 Drawing Figures

LIQUID-CUSHIONED BICYCLE SEAT

SUMMARY OF THE INVENTION

It is one object of this invention to provide a firm, yielding support for bicycle users which is adapted so as to be able to utilize water or any other liquid as a cushioning medium.

It is another object of this invention to provide a seat for bicycles which is adapted to utilize water or other suitable liquids as a cushioning medium and is composed of a plurality of cushioning compartments so that the hydrostatic pressure exerted within each compartment during use may be varied from time-to-time and maintained at a level independent from the hydrostatic pressure in the other respective compartments.

It is another object of this invention to provide a hydrostatically cushioned seat for bicycles and the like wherein the hydrostatic pressure in that portion of the seat which supports the buttocks of the rider may be controlled and maintained independently of the hydrostatic pressure in the pommel portion of the seat which supports the pelvic area of the rider.

It is another object of this invention to provide a hydrostatically cushioned seat for bicycles having a saddle compartment for receiving a cushioning liquid and supporting thereon the buttocks of the rider which is comprised of a first zone and a second zone wherein each zone is in fluid communication with the other zone such that as the bicycle is operated by peddling the pressure in each respective zone remains essentially constant.

It is a further object of this invention to provide a cushioned bicycle seat adaptable to utilize water or other cushioning liquids as a cushioning medium comprising a bladder constructed of a liquid impervious material having a broad saddle portion for supporting the buttocks of the rider and an elongated pommel extending forwardly up the saddle portion so as to be positioned between the legs of the rider when in use, said saddle portion and said pommel portion being hydrostatically isolated from one another so that differing hydrostatic pressures may be maintained in each respective portion; separate valve means for filling said saddle portion and said pommel portion with water or other cushioning liquid fluid; and a cover made of breathable material such as sheepskin or leather, which can be placed over the bladder and the seat of a bicycle to hold the bladder in snug engagement on the seat.

DESCRIPTION OF THE PREFERRED EMBODIMENT

Figure 1:
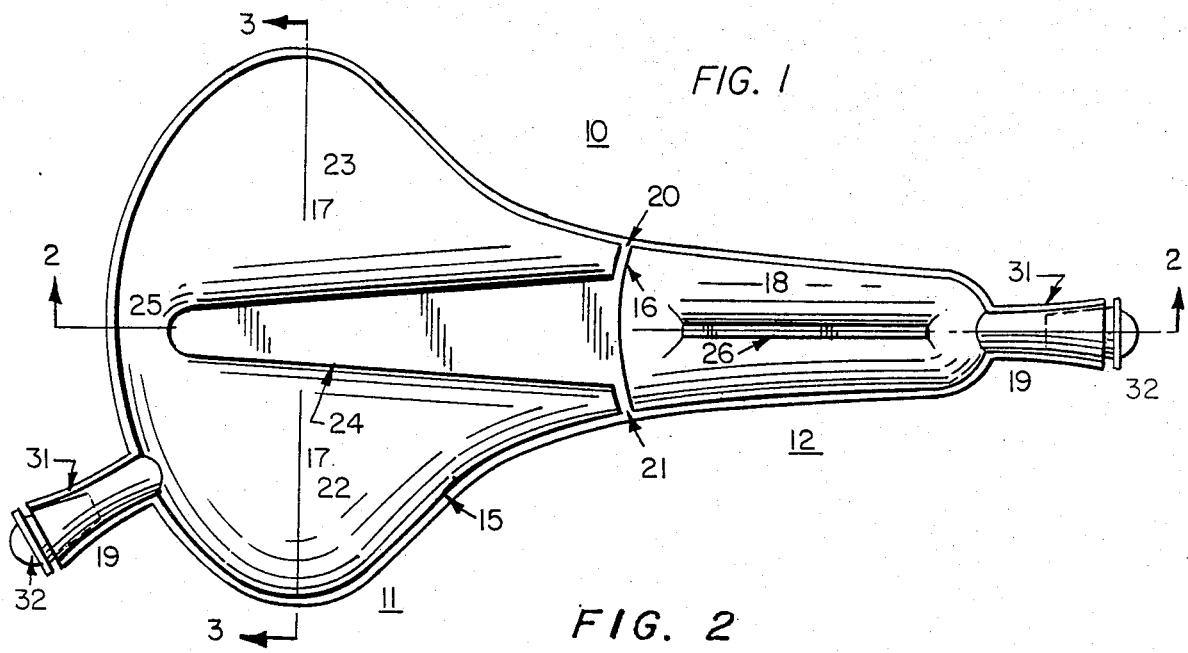
FIG. 1 is a top plan view of the liquid-cushioned bicycle seat.
Figure 2:
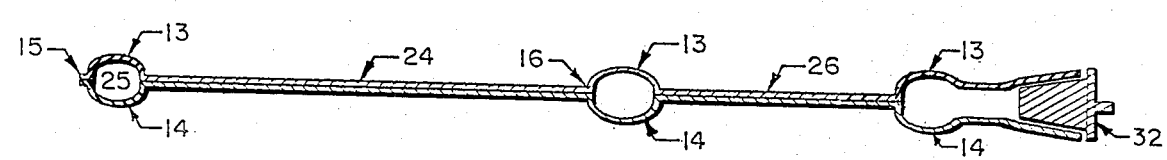
FIG. 2 is a cross sectional view taken generally along lines 2—2 of FIG. 1.
Figure 3:
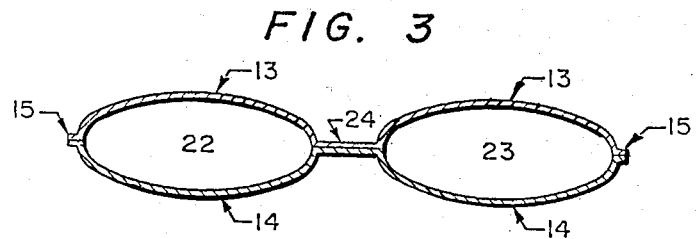
FIG. 3 is a cross sectional view taken generally along lines 3—3 of FIG. 1.

Referring to the drawings, wherein like numerals represent like elements throughout the several views, there is shown a bladder 10 having the same general configuration as a conventional bicycle seat with a relatively broad saddle portion 11 and a relatively elongated pommel portion 12 extending generally centrally of and forwardly from the saddle portion 11. In the preferred embodiment, the bladder 10 is constructed of polyurethane although it will be understood that any liquid impervious material which is adaptable to the uses of this invention will be satisfactory. As shown in FIG. 2, the bladder 10 consists of a top sheet 13 and a bottom sheet 14 which are heat-sealed by the known method of applying heat under pressure so as to join the edges of the top sheet 13 and bottom sheet 14 at an outer seam 15. The outer seam 15 is also liquid impervious and of sufficient strength to withstand the hydrostatic pressure exerted within the bladder 10 during normal operation of the bicycle.

The top sheet 13 and the bottom sheet 14 are also joined by a heat-sealing process forming a diaphragm 16 so as to define within the bladder 10 a saddle compartment 17 and a pommel compartment 18 which are isolated from one another such that the saddle compartment 17 is not in fluid communication with the pommel compartment 18. The diaphragm 16 has its terminal points 20, 21 joined to the portion of the outer seam 15 where the bladder 10 begins to translate from the pommel portion 12 to the saddle portion 11. Within the saddle compartment 17 there is defined a first zone 22 and a second zone 23 by means of a barrier 24 which extends from the diaphragm 16 rearwardly into the saddle compartment 17 but short of the rear portion of the outer seam 15 so as to create a constriction 25. It will be seen that the first zone 22 and the second zone 23 are in fluid communication with one another through the constriction 25. The barrier 24 may take any configuration consistent with the nature and use of this invention. In addition, it will be understood that the first zone 22 and the second zone 23 may be maintained in fluid communication with one another by providing one or more openings in the barrier 24 at any point of points along its length. In the preferred embodiment, the barrier 24 is formed by heat-sealing the top sheet 13 and the bottom sheet 14 so as to form the barrier 24 integrally with the diaphragm 16. The barrier 24 so formed has a broader base portion formed in conjunction with the diaphragm 16 and tapers rearwardly. By constructing the barrier 24 in this manner, a separation between the first zone 22 and the second zone 23 is created which by proper selection of the length and taper of the barrier 24 accommodates the anatomy of the rider by preventing the accumulation of water or other cushioning liquid along portions of the bladder 10 which do not directly support the buttocks of the rider. The rider's comfort in operation is thus enhanced.

The pommel compartment 18 has formed within it a baffle 26 which extends generally along the longitudinal extension of the pommel compartment 18 but is not connected to the outer seam 15 or the diaphragm 16. The baffle 26 serves to restrict the flow of any water or other cushioning liquid in the direction transverse to the longitudinal extension of the pommel compartment 18 upon the application of pressure by contact between the rider and the pommel portion 12 of the bladder 10. In the preferred embodiment, the baffle 26 is formed by heat-sealing the top sheet 13 and the bottom sheet 14 along the appropriate location. Obviously, other means of constructing a baffle 26 will be possible with the same general results.

The saddle compartment 17 and the pommel compartment 18 are each provided with separate valve means 19 for introducing a cushioning liquid such as water into each respective compartment. In the preferred embodiment, the valve means 19 comprise a conically shaped collar 31 extending into the saddle compartment 17 and the pommel compartment 18, respectively, so as to permit the passage of the liquid therethrough and a cylindrically shaped stopper 32 of such size and dimension as to matingly fit within its repsective collar 31 and be secured therein by friction so as to prevent the passage of the cushioning fluid from either the saddle compartment 17 or the pommel compartment 18 upon application of hydrostatic pressure. It will be understood, however, that any other suitable valve means may be used in conjunction with this invention.

Figure 4:
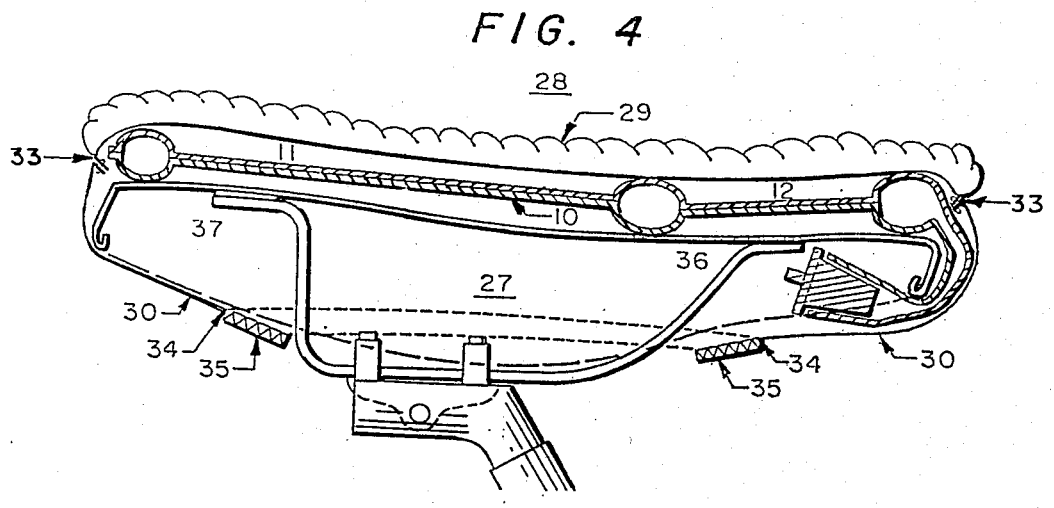
FIG. 4 is a cross sectional view of the liquid-cushioned bicycle seat in supportive engagement with an existing bicycle seat.
Figure 5:
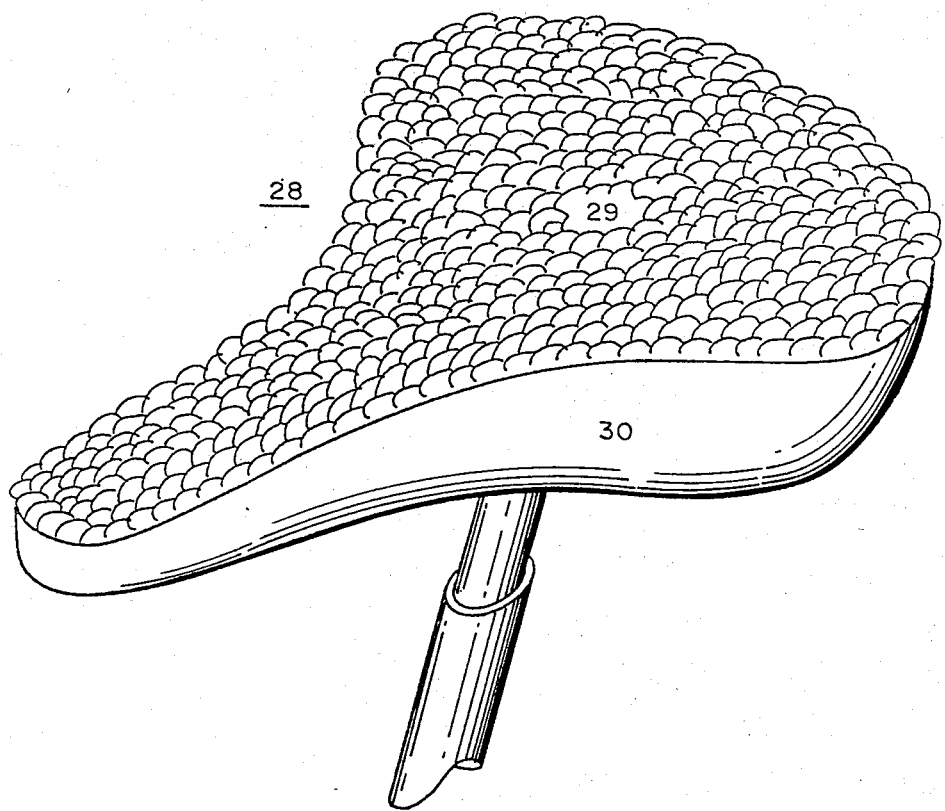
FIG. 5 is an elevational view of the cover of the liquid-cushioned bicycle seat.

Referring to FIG. 4, the bladder 10 is supported upon the existing seat 27 of the bicycle such that the pommel portion 12 is supported by the forward, pommel 36 of the seat 27 and the saddle portion 11 is supported by the saddle 37 of the seat 27. To secure the bladder 10 in supportive engagement with the seat 27, a cover 28 is provided to fit over the bladder 10 and seat 27 and be secured to the seat 27. The cover 28 has a seat portion 29 having the same general configuration as the bladder 10 which when placed provides a surface upon which the rider sits. The cover 28 is also provided with a skirt portion 30 attached by stitching at its first end 33 to the edge of the seat portion 29. The second end 34 of the skirt portion 30 of the cover 28 is provided with elastic means 35 to gather the second end 34 of the skirt portion 30 of the cover 28 around the bottom of the bicycle seat 27 when the cover 28 is stretched over the bladder 10 and the seat 27. It is understood that any satisfactory means for securing the cover 28 snugly around the bladder 10 and the seat 27, such as a drawstring, will be consistent with the scope of this invention.

The cover 28 may be fabricated with any suitable material. Preferably, the material used is of such nature as to breathe or permit the passage of air therethrough so that the rider will not be caused to sweat or chafe while placed upon the cover. Leather, suede and sheepskin have proven to be suitable for this purpose. In the preferred embodiment, the seat portion 29 is made of a soft, fleecy material such as sheepskin to provide comfort for the rider while the skirt portion 30 is made of leather or other similar material having a smooth surface to provide a less obtrusive, less frictional surface to accommodate the movement of the rider's thighs along its surface.

In operation, it will be seen that the first zone 22 and the second zone 23 of the saddle compartment 17 provide support for the rider when positioned upon the bicycle seat 27 by engaging the upper thighs and buttocks of the rider. The pommel compartment 18 may or may not contain water depending upon the rider's wishes. The support provided by the saddle compartment 17 is not affected by the pressure, if any, in the pommel compartment 18. As the rider operates the peddles of the bicycle, his/her legs alternatingly thrust downward, placing cyclically increased pressure on the surface supporting the buttocks and upper thighs of the leg being thrust. The pressure being exerted on the first zone 22 and the second zone 23 thus cyclically increases and decreases within each zone as the bicycle is peddled. Upon the increase applied to either zone 22, 23 water or other cushioning liquid is urged into the other zone through the constriction 25 where the pressure applied in peddling has been decreased. The result is a general stabilization of the hydrostatic pressure in both zones 22, 23 throughout the peddling cycle. The constriction also serves as a baffle to control the direction and movement of the cushioning media from one zone 22, 23 to the other 22, 23 upon compression caused by peddling.

What is claimed is:

1. A liquid-cushioned bicycle seat comprising:
   a. A bladder having a broader saddle portion and a narrower, elongated pommel portion extending generally centrally of and forwardly from said saddle portion, wherein said bladder is composed of a top sheet of a liquid impervious material and a bottom sheet of a liquid impervious material joined together at their outer edges so as to form an outer seam and further joined along a diaphragm so as to define therein a saddle compartment and a pommel compartment wherein said saddle compartment is hydrostatically isolated from said pommel compartment;
   b. A barrier formed within said saddle compartment extending from said diaphragm rearwardly into said saddle compartment but short of said outer seam so as to define within said saddle compartment a first zone and a second zone positioned on opposite sides of said barrier, said first zone and said second zone being in fluid communication across a constriction defined by the interior projection of said barrier and said outer seam,
   c. Separate stopper means for independently filling said saddle compartment and said pommel compartment with a liquid cushioning medium comprising:
      i. Separate conically shaped collars projecting into either of said saddle compartment or said pommel compartment, respectively, and
      ii. Separate conically shaped stoppers of such size and dimension as to matingly fit into either of said collars, respectively, being secured therein by friction so as to contain any liquid placed within either said saddle compartment of said pommel compartment upon the exertion of hydrostatic pressure; and
   d. A cover for securing said bladder in snug supportive engagement with a bicycle seat when said bladder is placed upon a bicycle seat and said cover is placed around said bladder and bicycle seat, comprising:
      i. A seat portion constructed of a breathable material;
      ii. A skirt portion constructed of a material having a smooth surface having one end attached to the periphery of said seat portion; and
      iii. Elastic means for drawing a second end of said skirt portion around the bottom of the bicycle seat when the cover is in place.

2. A liquid cushioned bicycle seat comprising:
   a. A bladder having a broader saddle portion and a narrower, elongated pommel portion extending generally centrally of and forwardly from said saddle portion, wherein said bladder is composed of a top sheet of a liquid impervious material and a bottom sheet of a liquid impervious material joined together at their outer edges so as to form an outer seam and further joined along a diaphragm so as to define therein a saddle compartment and a pommel compartment wherein said saddle compartment is hydrostatically isolated from said pommel compartment;

b. A barrier formed within said saddle compartment extending from said diaphragm rearwardly into said saddle compartment so as to define within said saddle compartment a first zone and a second zone positioned on opposite sides of said barrier, said first zone and said second zone being in fluid communication across openings defined at the opposite ends of said barrier;

c. Separate stopper means for independently filling said saddle compartment of said pommel compartment with a liquid cushioning medium comprising:
  i. Separate conically shaped collars projecting into either of said saddle comparment or said pommel compartment, respectively, and
  ii. Separate conically shaped stoppers of such size and dimension as to matingly fit into either of said collars, respectively, being secured therein by friction so as to contain any liquid placed within either said saddle compartment of said pommel compartment upon the exertion of hydrostatic pressure; and d. A cover for securing said bladder in snug supportive engagement with a bicycle seat when said bladder is placed upon a bicycle seat and said cover is placed around said bladder and bicycle seat, comprising:
  i. A seat portion constructed of a breathable material;
  ii. A skirt portion constructed of a material having a smooth surface having one end attached to the periphery of said seat portion; and
  iii. Elastic means for drawing a second end of said skirt portion around the bottom of the bicycle seat when the cover is in place.

* * * * *